United States Patent [19]
Gutek et al.

[11] Patent Number: 5,679,726
[45] Date of Patent: Oct. 21, 1997

[54] METHOD OF MAKING A FOUNDATION POLYDIORGANOSILOXANE-SILICA MIXTURE, THE RESULTING MIXTURE AND A ROOM TEMPERATURE CURING SEALANT MADE FROM THE FOUNDATION MIXTURE

[75] Inventors: Beth Irene Gutek, Freeland; Loren Dale Lower; Sherwood Spells, both of Midland, all of Mich.

[73] Assignee: Dow Corning Corporation, Midland, Mich.

[21] Appl. No.: 564,757

[22] Filed: Nov. 29, 1995

[51] Int. Cl.$^6$ .................................................. C08L 83/04
[52] U.S. Cl. ........................ 523/212; 524/588; 524/847; 524/860; 524/863; 524/862; 427/213
[58] Field of Search ............................ 524/588, 847, 524/860, 863, 862; 427/213; 523/212

[56] References Cited

U.S. PATENT DOCUMENTS

| | | | |
|---|---|---|---|
| 2,890,188 | 6/1959 | Konkle et al. | 260/29.1 |
| 5,153,238 | 10/1992 | Bilgrien et al. | 523/211 |
| 5,391,594 | 2/1995 | Romensko et al. | 523/212 |
| 5,412,014 | 5/1995 | Romenesko | 524/416 |

FOREIGN PATENT DOCUMENTS 2284609  6/1995  United Kingdom.

*Primary Examiner*—Karen A. Dean
*Attorney, Agent, or Firm*—Roger H. Borrousch

[57] ABSTRACT

A process of making a polydiorganosiloxane-silica foundation mixture from a free-flowing, powdered, surface-modified, reinforcing silica-polydiorganosiloxane concentrate used to make, for example, RTV silicone sealant compositions which have non-sag properties. The foundation mixtures are made by combining, mixing, and heating a reinforcing silica filler and a diol surface modifying agent to a temperature of 20° C. to <180° C. using 0.05 to 0.5 parts by weight of the diol per one part by weight of the silica. Polydiorganosiloxane is added gradually to the resulting fluidized filler over a time period of less than 10 minutes to obtain the free flowing powdered reinforcing silica-polydiorganosiloxane concentrate. The foundation mixture is obtained by massing the concentrate and adding more polydiorganosiloxane to obtain a mixture which has from 5 to 20 weight percent silica filler. The foundation mixtures have a plateau stress of >700 dynes/cm$^2$ and a shear-thinned viscosity of no more than 1,000 Pa.s at a shear stress of 50,000 dynes/cm$^2$. RTV silicone sealant compositions can be obtained in 10 to 15 minutes from the start of making the surface modified silica filler to the complete sealant composition.

49 Claims, No Drawings

METHOD OF MAKING A FOUNDATION POLYDIORGANOSILOXANE-SILICA MIXTURE, THE RESULTING MIXTURE AND A ROOM TEMPERATURE CURING SEALANT MADE FROM THE FOUNDATION MIXTURE

BACKGROUND OF THE INVENTION

1. Field of the Invention

This invention relates to a process of preparing a foundation polydiorganosiloxane-silica mixture and a non-slump room temperature vulcanizable (RTV) silicone sealant. 2. Background Information RTV silicone sealants are used for a variety of adhesive and weatherproofing applications. Many of these applications require a material to have the consistency that allows it to be installed in the uncured state in a vertical configuration while maintaining its shape until cure has occurred. A sealant which maintains its shape in a vertical configuration until cure has occurred is said to have non-slump or non-sag properties. If a sealant sags or flows from its initial configuration, the desired weatherproofing or adhesive property will not be obtained. A typical silicone sealant formulation comprises a silicone polymer, a curing agent, such as a crosslinker or a combination of a crosslinker and a curing catalyst, and a filler, such as a reinforcing silica filler and an extending filler. The reinforcing silica, such as fumed silica filler, is used to provide reinforcement to the polymeric network, to provide a thixotropic property to the uncured composition, and to provide higher tensile strength and tear strength to the cured product. It is generally known that the silica must be treated in order to produce a non-sag sealant composition. Without treatment, a slumpy or saggy sealant composition can result.

One way to prepare non-sag silicone sealants is to first react a crosslinker with a silicon-bonded hydroxyl endblocking group of a polydiorganosiloxane and then follow with the addition of silica filler. Using this approach, crosslinker is used in an amount sufficient to react with the hydroxyl groups of the polydiorganosiloxane and the hydroxyl groups on the silica. This process provides the desired non-sag sealant composition, but this means the process is limited to one type of cure chemistry, such as to a sealant composition with organotriacetoxysilane crosslinker or a sealant composition with organotrioximosilane crosslinker, during the manufacturing operations. However, if a foundation mixture could be prepared without the curing agent, i.e. crosslinker and curing catalyst, and if this foundation mixture could be used as the basis for the preparation of a variety of sealant compositions having different curing agent chemistries, the advantages are many. For example, one type of starting mixture means that only minor changes on continuous mixing equipment are required, such that change over from one sealant composition or another type can be readily done. The number of ingredients in inventory can be reduced and equipment can become available for other manufacturing processes. Also, the flexibility of the kinds of products made from one starting material is an advantage for meeting customer needs in a hurry.

SUMMARY OF THE INVENTION

In order to make a foundation mixture viable for the manufacture of sealant compositions, it needs to be stable over the time period from immediately after its preparation to the time when the foundation mixture is formulated into an RTV silicone sealant composition. By being stable for the purposes of this invention, it means that the foundation mixture can be used to formulate a sealant composition and the resulting sealant composition will have a maximum slump of 0.51 cm (0.20 inch) as defined by ASTM D 2202, preferably less.

It is desirable to prepare a non-sag, one-package, RTV, silicone sealant composition from a foundation mixture which avoids during storage the well-known silica-polymer interaction problems, known as crepe hardening or structure formation. Generally, it is believed that the use of pretreated reinforcing silica fillers eliminates these silica-polymer interactions and provides a stable composition comprising polydiorganosiloxane and reinforcing silica filler. However, the present inventors have found that a stable foundation mixture of silica filler and polydiorganosiloxane wherein the siloxane polymer has a viscosity at 25° C. of 400 Pa.s or less, is not obtained with ordinary pretreated reinforcing silica fillers. In fact, commercially available pretreated silica fillers, such as TS-610 (R) and TS-530(R) available from Cabot Corporation, Tuscola, Ill., required additional treatment to produce a foundation mixture with long term stability such that an acceptable sealant composition could be produced after times as long as one year. TS-610 is a dimethyldichlorosilane treated fumed silica with a surface area of about $120\pm20$ m$^2$/g and TS-530 is a hexamethyldisilazane treated fumed silica with a surface area of about $200\pm40$ m$^2$/g.

One embodiment of this invention relates to a process for making a polydiorganosiloxane-silica foundation mixture from a free-flowing, powdered, surface-modified, reinforcing silica-polydiorganosiloxane concentrate comprising (i) combining, while mixing and heating, reinforcing silica filler having a surface area of 90 to 500 m$^2$/g and having a median aggregate-agglomerate particle size less than 600 micrometers and a diol surface modifying agent of the formula R'O(R$_2$SiO)$_x$R' wherein R is methyl, ethyl, vinyl, 3,3,3-trifluoropropyl, or phenyl, each R' is selected from the group consisting of hydrogen atom, methyl radical, and ethyl radical, up to 30 percent of the R' can be methyl radical or ethyl radical, and x is a value of from 2 to 18 inclusive and the diol surface modifying agent has at least 3 weight percent silicon-bonded hydroxyl group, making a filler mixture where there is 0.05 to 0.5 part by weight of diol per one part by weight of silica filler, (ii) mixing the filler mixture at a temperature in the range of from 20° C. to <180° C. and maintaining the filler mixture in a fluidized powder state until the diol is dispersed throughout the silica filler and the median aggregate-agglomerate particle size of the filler mixture is less than the median aggregate-agglomerate particle size of the silica filler, this mixing process does not exceed 5 minutes in duration, and removing volatiles from the filler mixture during the mixing process, (iii) adding gradually, with mixing, a polydiorganosiloxane having a viscosity measured at 25° C. of from 0.1 to 400 Pa.s to the modified silica filler obtained from step (ii) and completing the addition in <10 minutes after the modified silica filler is obtained at the conclusion of step (ii), where the amount of polydiorganosiloxane is added to provide from 25 to 40 weight percent silica filler based on the total weight of the polydiorganosiloxane and the modified silica filler, thereafter (iv) mixing until a uniform free flowing powder of a reinforcing silica-polydiorganosiloxane concentrate is obtained where the total mixing time of steps of (iii) and (iv) does not exceed 10 minutes, thereafter (v) massing the uniform free-flowing silica-polydiorganosiloxane concentrate obtained from step (iv) until a paste consistency mixture is obtained, and (vi) admixing gradually more polydiorganosiloxane making a uniform foundation mixture having a higher concentration of polydiorganosiloxane than the free-flowing silica-polydiorganosiloxane concentrate and the silica filler content of the uniform foundation mixture is from 5 to 20 weight percent based on the total weight of the foundation mixture.

Another embodiment of this invention relates to a process for making polydiorganosiloxane-silica foundation mixture from a free-flowing, powdered, surface-modified, reinforcing silica-polydiorganosiloxane concentrate comprising (a) heating reinforcing silica filler having a surface area of 90 to 500 m$^2$/g and having a median aggregate-agglomerate particle size less than 600 micrometers to a temperature in a range of from >100° C. to <180° C., removing volatiles from the silica filler, thereafter (b) adding to the heated reinforcing silica filler while mixing, a diol surface modifying agent of the formula R'O(R$_2$SiO)$_x$R' wherein R is methyl, ethyl, vinyl, 3,3,3-trifluoropropyl, or phenyl, each R' is selected from the group consisting of hydrogen atom, methyl radical, and ethyl radical, up to 30 percent of R' can be methyl radical or ethyl radical, and x is a value of from 2 to 18 inclusive and has at least 3 weight percent silicon-bonded hydroxyl group, making a filler mixture where there is 0.05 to 0.5 part by weight of diol per one part by weight of silica filler, and (c) heating and mixing the filler mixture at a temperature in the range of from >100° C. to <180° C and maintaining the filler mixture in a fluidized state until the diol is dispersed throughout the silica filler and the median aggregate-agglomerate particle size of the filler mixture is less than the median aggregate-agglomerate particle size of the silica filler, the mixing process does not exceed 5 minutes in duration, and removing volatiles from the filler mixture during the mixing process where a modified silica filler is obtained, (d) adding gradually, with mixing, a polydiorganosiloxane having a viscosity measured at 25° C. of from 0.1 to 400 Pa.s to the modified silica filler of step (c) and completing the addition in <10 minutes after the modified silica filler is obtained at the conclusion of step (c), where the amount of polydiorganosiloxane is added to provide from 25 to 40 weight percent silica filler based on the total weight of the polydiorganosiloxane and the modified silica filler, thereafter (e) mixing until a uniform, free-flowing, powdered, surface-modified, reinforcing silica-polydiorganosiloxane concentrate is obtained where the total mixing time of steps (d) and (e) does not exceed 10 minutes, (f) massing the uniform free-flowing silica-polydiorganosiloxane concentrate until a paste consistency mixture is obtained, and thereafter (g) admixing gradually more polydiorganosiloxane making a uniform foundation mixture having a higher concentration of polydiorganosiloxane than the uniform free-flowing silica-polydiorganosiloxane concentrate obtained in step (e) and the silica filler content of the foundation mixture is from 5 to 20 weight percent based on the total weight of the foundation mixture.

A further embodiment relates to a foundation mixture comprising 5 to 20 parts by weight reinforcing silica filler having a surface area of 90 to 500 m$^2$/g, and 80 to 95 parts by weight of a polydiorganosiloxane having a viscosity of from 0.1 to 400 Pa.s where such foundation mixture has a plateau stress of >700 dynes/cm$^2$ and a shear-thinned viscosity of no more than 1,000 Pa.s at a shear stress of 50,000 dynes/cm$^2$ and the plateau stress and the shear-thinned viscosity are measured at 25° C.

DETAILED DESCRIPTION OF THE PREFERRED EMBODIMENTS

The process of this invention is to prepare a foundation mixture of polydiorganosiloxane and reinforcing silica which can be used to make one-package, RTV, silicone sealant compositions which are non-sag. In the process of combining reinforcing silica filler with silanol terminated polydiorganosiloxane, non-sag silicone sealants can be made from the foundation mixture, if the reinforcing silica filler is combined with a short chain polydiorganosiloxane having silicon-bonded hydroxyl groups using certain process steps to modify the silica filler surface.

The short chain polydiorganosiloxane having silicon-bonded hydroxyl groups for the purposes of this invention is defined as a diol surface modifying agent (referred to herein as diol) of the formula R'O(R$_2$SiO)$_x$R' wherein R is methyl, ethyl, vinyl, 3,3,3-trifluoropropyl, or phenyl, each R' is hydrogen atom, methyl radical, or ethyl radical, and x is a value of from 2 to 18 inclusive and has at least 3 weight percent silicon-bonded hydroxyl group. The preferred diols are those which are mixtures of molecules where at least 50 percent of the molecules have values for x of no more than 6 and the hydroxyl content of the mixture is at least 6 weight percent. Diols which have values of x of less than 6 provide foundation mixtures with longer stable storage times than those diols having a value of x greater than 6. Particularly useful diols are those which are mixtures of molecules where x has a value of about 4, and the R and R' groups are methyl and R' is from 10 to 20 percent methyl.

The reinforcing silica fillers are those which have a surface area of 90 to 500 m$^2$/g and have a median aggregate-agglomerate particle size of less than 600 micrometers. The aggregate-agglomerate particle sizes can be determined by a Coulter Particle Size Analyzer Model No. LS130, Hialeah, Fla. Many of this kind of silica filler are available commercially today and are well known, such as fumed silica and precipitated silica. The silica fillers can be either untreated or treated. Treated silica fillers are well known in the art and as stated previously many are available commercially, such as TS-610 and TS-530. The silica filler treatments include triorganosiloxy surface treatment from reaction with triorganochlorosilane, hexaorganodisiloxane, hexaorganodisilazane; other silane treatments such as dimethyldichlorosilane,; and from various polydiorganosiloxanes which are endblocked with silicon-bonded hydroxyl groups or silicon-bonded alkoxy groups.

The diol and the silica filler are combined while mixing and heating, step (i). They are combined such that there is from 0.05 to 0.5 part by weight of diol per part by weight of silica filler. The amount of diol used in making the modified silica filler which provides the most stable foundation mixtures, i.e. have the longest storage times and still produce a non-sag, one-package, RTV, silicone sealant composition, are those which have more than 0.25 part by weight of diol per part of silica filler. The storage stability of the foundation mixture and its ability to be formulated into non-sag sealant compositions is related to the chain length of the diol and its hydroxyl content. In both the foundation mixture and the sealant composition where everything is substantially equal except for the diol, the higher the diol chain length, such as x being 18, and the lower the hydroxyl content of the diol, such as about 3 weight percent, the more diol is required to obtain equivalent storage stability for the foundation mixture and equivalent sealant composition slump, compared to that which is obtainable from using diols with shorter chain lengths and higher hydroxyl content. Conversely, the shorter the diol chain length, such as x being 2 to 4, and the higher the hydroxyl content of the diol, the lower the concentration of diol required to obtain equivalent storage stability for the foundation mixture and equivalent sealant composition slump. Preferably, the diol is present in an amount such that there is from 0.015 to 0.025 part by weight of silicon-bonded hydroxyl group per one part by weight of silica filler.

The mixture of diol and silica filler are fluidized (agitated) at a temperature of from 20° C. to <180° C., preferably from >100° C. to <180° C., and more preferred >150° C. to 180° C. and the resulting filler mixture is maintained in the fluidized powder state until the diol is thoroughly dispersed throughout the silica filler and the median aggregate-agglomerate particle size of the filler mixture is less than the median aggregate-agglomerate particle size of the starting silica filler step (ii). The filler mixture becomes more flowable and may be called "more fluffy" than the starting silica filler at this point of the process. At the "more fluffy" point, a modified silica filler is obtained. The density of the filler mixture may be reduced to 2 or 3 pounds per cubic foot (32–48 kg/m$^3$) at this point of the process. This fluffy state is an indication that the diol is dispersed throughout the silica filler. The mixing and heating step to obtain the modified silica filler should not exceed 5 minutes, and preferably it is one minute or less. During this mixing and heating step the volatiles are removed. This can be accomplished by means of a partial vacuum, by a nitrogen gas sweep or purge, or using a combination of both partial vacuum and nitrogen gas sweep. When this mixing and heating step goes beyond the 5 minutes duration, no advantages are observed. The rate of dispersion of the diol with the silica filler is increased by the addition of small amounts of hexamethyldisilazane, such as less than 0.1 weight percent based on the weight of the diol.

The heating and mixing can be accomplished by any mixing equipment which provides the necessary fluidization and agitation to maintain the diol and silica filler in a constant fluid state, heat as required, and removal of the volatiles. One such mixer is a Littleford Plowshear mixer/granulator, from Littleford Bros., Inc, Florence, Ky. This mixer provides a hurling and whirling action which are imparted by plow shaped mixing tools. The plow blades are coupled with high speed blending chopper blades which can rotate at 3600 rpm which introduce high impact and shear. This particular equipment provides the required mixing for the preparation of the modified silica filler along with the ability to heat and remove volatiles. There is a window of mixing and heating time for which the resulting modified silica filler has the excellent properties to provide storage stable products in which it is used, such as the foundation mixture and the one-package RTV silicone sealant composition which has non-sag properties. In this window of mixing time, there is a relationship between the amount of diol and the temperature to provide the excellent properties. At temperatures in the high part of the described range, smaller amounts of diol can be used to obtain the excellent properties whereas at temperatures in the lower part of the range, larger amounts of diol are needed to achieve the same excellent results. By storage stable it is meant that the products maintain their properties throughout the time period beginning at the time when they are made to the time when they are finally used to make an RTV silicone sealant composition and to the time when the RTV is cured. It is desirable to retain the uncured properties, such as rheology and non-sag properties of the RTV silicone sealant composition, as well as, the properties of the cured sealant, such as tensile strength, elongation, modulus, and tear strength.

A preferred process for making the modified silica filler is to heat the reinforcing silica filler to a temperature in the range of from >100° C. to <180° C. and remove volatiles from the silica filler, such as water which is often associated with silica fillers, step (a). The volatiles can be removed as described previously such as by a partial vacuum, by a nitrogen gas sweep, or by a combination of these two. The time is usually rather short for this step in view of the temperature used and with a gas sweep, the volatiles are readily removed in times of one minute or less. Preferably the temperature is between >150° C. and <180° C. and the time is about one minute.

After the volatiles are removed, the heating and mixing is continued and the diol is added, step (b), as defined above and in the amounts as stated. The duration of the heating and additional mixing is as described above. The filler mixture is heated at a temperature in the range of >100° C. to <180° C., preferably >150° C. to <180° C. maintaining it in a fluidized state until the diol is thoroughly dispersed throughout the silica filler and the particle sizes are observed to change as described above, step (c). This mixing process does not exceed more than 5 minutes in duration and the volatiles are removed as discussed previously to obtain a modified silica filler, preferably this mixing process is from 30 seconds to 60 seconds in duration. Steps (d), (e), (f), and (g) of the preferred process are the same as the steps (iii), (iv), (v), and (vi) as found in the following description.

After the modified silica filler is prepared, a polydiorganosiloxane having a viscosity measured at 25° C. of from 0.1 to 400 Pa.s is gradually added to the modified silica filler, such that, the addition is completed in less than 10 minutes, preferably less than 5 minutes (step iii). A sufficient amount of polydiorganosiloxane is added to provide a uniform free flowing powder concentrate having from 25 to 40 weight percent silica filler based on the total weight of the concentrate. The modified silica filler and polydiorganosiloxane are mixed until a uniform free flowing powder concentrate of polydiorganosiloxane and silica filler is obtained (step iv). The total mixing time in steps (iii) and (iv) should not exceed 10 minutes to obtain the uniform, free-flowing, powdered, polydiorganosiloxane-silica filler concentrate. Over mixing by exceeding the 10 minute mixing time for steps (iii) and (iv), can cause the powder to agglomerate creating lumps and other inconsistencies such that the powdered concentrate is not as free flowing as needed resulting in more difficult processing conditions when making sealant compositions.

In step (iii), the polydiorganosiloxane can be added incrementally to the modified silica filler obtained from step (ii). There does not seem to be any significant property variation to adding the polydiorganosiloxane continuously at a gradual pace or incrementally, except that adding it continuously at a gradual pace results in easier processing to obtain the powdered concentrate.

The polydiorganosiloxane can be selected from those having silicon-bonded hydroxyl groups at both ends or a mixture of polydiorganosiloxanes wherein more than 50 percent of the polymer molecules have silicon-bonded hydroxyl groups at both ends and the remaining polymer molecules contain silicon-bonded hydroxyl groups on one end and triorganosiloxy units as the endblocker on the other end. Those polydiorganosiloxanes which are mixtures of polydiorganosiloxanes with silicon-bonded hydroxyl groups on both ends and polydiorganosiloxanes with silicon-bonded hydroxyl groups on one end and triorganosiloxy units at the other end are known in the art as shown by Dupree in U.S. Pat. No. 3,274,145, issued Sep. 20, 1966, which is hereby incorporated by reference to show polydiorganosiloxane mixtures having both silicon-bonded hydroxyl groups and triorganosiloxy groups. For this invention, when polymers having both silicon-bonded hydroxyl groups and triorganosiloxy groups are used in step (iii) to make the powdered concentrate, those which are preferred have at least 80 percent of the ends terminated with silicon-bonded hydroxyl groups. The polydiorganosiloxanes preferably have a viscosity at 25° C. of from 5 to 100 Pa.s. The polydiorganosiloxanes comprise diorganosiloxane units of the formula R"$_2$SiO where R" is a monovalent hydrocarbon radical or a halogenated monovalent hydrocarbon radical which are illustrated by alkyl radicals including methyl, ethyl, propyl, isopropyl, butyl, pentyl, hexyl, and the like; alkenyl radicals, such as vinyl, allyl, hexenyl, and the like; cycloalkyl, such as cyclopentyl and cyclohexyl; aryl such as phenyl and tolyl; and haloalkyl such as chloropropyl, trifluoropropyl, (2-perfluoropropyl)ethyl, and the like. The preferred polydiorganosiloxanes are those which have mostly methyl with minor amounts of vinyl and phenyl radicals. Although these polymers are defined as polydiorganosiloxanes, small amounts of other units such as monoorganosilsesquioxane units, or SiO$_2$ units may be present as frequently found in the polydiorganosiloxane as a result of the manufacturing methods used. By small amounts, it is meant that there are less than about 5 mole percent of such units, preferably less than 2 mole percent.

Other kinds of polydiorganosiloxanes can be used such as those which are endblocked with hydrolyzable containing silicon units, such as trimethoxysiloxy units, triethoxysiloxy units, methyldimethoxysiloxy units, and methyldiethoxysiloxy units, as described by Brown et al in U.S. Pat. No. RE 29,760, reissued Sep. 12, 1978, and which is hereby incorporated by reference to show such polyalkoxy terminated polydiorganosiloxanes and their method of preparation. These polyalkoxy terminated polydiorganosiloxanes are illustrated by the formula

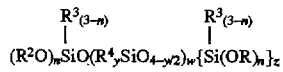

in which R$^2$ is an aliphatic hydrocarbon radical or halogenated aliphatic hydrocarbon radical of from 1 to 8 inclusive carbon atoms, R$^3$ and R$^4$ are each selected from the group consisting of monovalent hydrocarbon radicals and monovalent halohydrocarbon radicals all of from 1 to 18 inclusive carbon atoms, n has an average value of from 2 to 3 inclusive, y has an average value of from 1.99 to 2 inclusive, z has an average value of from 1 to 1.01, the sum of y and z is 3, and w has a value such that the viscosity at 25° C. is from 0.1 to 400 Pa.s.

Some other polyalkoxy terminated polydiorganosiloxanes are those which contain divalent hydrocarbon linkages at the terminal portion of the polydiorganosiloxane, such as those described by Weyenberg in U.S. Pat. No. 3,175,993, issued Mar. 30, 1965, by Kamis et al in U.S. Pat. No. 4,898,910, and by Klosowski et al in U.S. Pat. No. 4,871,827, issued Oct. 3, 1989, all of which are hereby incorporated by reference to show such polydiorganosiloxanes and methods of their preparation. These polydiorganosiloxanes have a formula

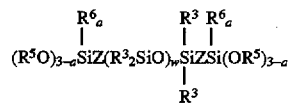

in which each R$^5$ is methyl, ethyl, propyl, or butyl, each R$^6$ is free of aliphatic unsaturation and is a monovalent hydrocarbon or monovalent halogenated hydrocarbon all of 1 to 18 inclusive carbon atoms, R$^3$ and w are defined above, Z is a divalent hydrocarbon radical or combination of divalent hydrocarbon radicals and siloxane radicals, and a is 0 or 1. Polydiorganosiloxanes which have other silicon bonded hydrolyzable groups at their terminals may also be useful, for example acetoxy groups and ketoximo groups.

After the powdered concentrate in step (iv) is obtained, it is then massed until a paste consistency mixture is obtained (step v). This massing process is easily accomplished when the amount of silica filler in the concentrate is in the 25–30 weight percent range especially when the viscosity of the polydiorganosiloxane is less than 50 Pa.s when measured at 25° C. The massing process requires equipment with high shear when the amount of silica filler is at the higher concentration, for example, 35–40 weight percent range especially when the viscosity of the polydiorganosiloxane is greater than 50 Pa.s when measured at 25° C.

More polydiorganosiloxane is gradually admixed with the massed concentrate to provide a uniform foundation mixture which contains from 5 to 20 weight percent silica filler based on the total weight of the foundation mixture, preferably the foundation mixture contains from 5 to 15 weight percent silica filler. As the concentration of silica filler in the foundation mixture increases above 15 weight percent, the processing becomes more difficult as the viscosity increases and it requires greater energy to produce sealant compositions as well as making uniform foundation mixture initially. The concentration of the polydiorganosiloxane in the foundation mixture is higher than in the free-flowing silica-polydiorganosiloxane concentrate. The polydiorganosiloxane is preferably added and mixed under conditions which keeps the formation of voids at a minimum. Keeping the formation of voids to a minimum results in a quicker preparation of the uniform foundation mixture. When a paste consistency material is mixed with a fluid material such as the polydiorganosiloxane, the incorporation of voids from a gas atmosphere is very likely to occur and extra care is required to keep the formation of such voids at a minimum. Other kinds of polydiorganosiloxanes can be used such as those which are endblocked with hydrolyzable containing silicon units, like the polyalkoxy terminated polydiorganosiloxanes are described herein and further described by Brown et al, Weyenberg, and Klosowski et al.

The preferred foundation mixtures have a "plateau stress" value of >700 dynes/cm$^2$, preferably >1,000 dynes/cm$^2$. This plateau stress value is a measure of polymer/filler interaction. After initial preparation plus any storage aging, a foundation mixture is considered stable when the plateau stress value is >700 dynes/cm$^2$, where this would be the point at which a crosslinker and a catalyst, if used, would be added to the foundation mixture. Sealant compositions made from foundation mixtures which have a plateau stress >1,000 dynes/cm$^2$, produce a composition with <0.5 cm (<0.2 inch) flow when measured by ASTM D 2202. The preferred foundation mixtures also have a shear-thinned viscosity of no more than 1,000 Pa.s at a shear stress of 50,000 dynes/cm$^2$, and preferably no more than 600 Pa.s where the viscosity is measured at 25° C. Therefore, the preferred foundation mixtures are those having a plateau stress of >700 dynes/cm$^2$ and a shear-thinned viscosity of no more than 1,000 Pa.s. Even more preferred foundation mixtures are those having a plateau stress of >1,000 dynes/cm$^2$ and a shear-thinned viscosity of no more than 600 Pa.s.

Plateau stress values were determined, for the purposes of this application, on a Carri-Med Rheometer (Model CSL 500) using cone and plate. The flow method was used to determine plateau stress values. The cone was a 0.5 degree, 2 cm diameter cone and the gap between the cone and the plate during testing was 13 microns (the test specimen thickness). Foundation mixture was gently removed from the storage container. A few grams were placed on the temperature controlled bottom plate (at 25° C.) before the plate was raised into position with the top cone to provide a specimen thickness of 13 microns. The test specimen was allowed to equilibrate for 1 to 5 minutes to reach the 25° C. condition. An initial stress of 100 dynes/cm$^2$ was applied to the test specimen. After equilibration, the shear stress was increased until the shear stress reached 50,000 dynes/cm$^2$ over a 5 minute period in a logarithmic stress sweep mode. This was called the up curve. Once 50,000 dynes/cm$^2$ was reached, this stress was held for 30 seconds. The shear stress was reduced to 100 dynes/cm$^2$ over a 5 minute period. This was called the down curve. The plateau stress value in dynes/cm$^2$ was the shear stress at the shear rate of 0.023 sec$^{-1}$ on the down curve. The shear-thinned viscosity was that viscosity measured when the shear stress was at 50,000 dynes/cm$^2$.

The resulting foundation mixtures are non-sag and can be used to make other silicone compositions which are non-sag, especially one-package, RTV, silicone sealant compositions. Such silicone sealant compositions can be prepared by adding a moisture hydrolyzable crosslinking silicone compound as a curing agent comprising a crosslinker or a crosslinker and a curing catalyst. The particular crosslinker can have an effect on the non-sag property of the final RTV silicone sealant composition. Curing catalysts are used, as required, to provide the utility of cure for the one-package, RTV, silicone sealant compositions made using the foundation mixture.

The crosslinker is a silicon compound containing silicon-bonded hydrolyzable groups, preferably silanes. The silicon-bonded hydrolyzable group is exemplified by acyloxy groups such as acetoxy, octanoyloxy, and benzoyloxy; ketoximo groups such as the dimethyl ketoximo group, the methylethyl ketoximo group, the diethyl ketoximo group, the amylmethyl ketoximo group, and the isobutylmethyl ketoximo group; alkoxy groups such as methoxy, ethoxy, and propoxy; alkenyloxy groups such as isopropenyloxy and 1-ethyl-2-methylvinyloxy; amino groups such as dimethylamino, diethylamino, butylamino, and cyclohexylamino; aminoxy groups such as dimethylaminoxy; and amido groups such as the N-methylacetamido group, N-ethylacetamido group, and N-methylbenzamido group. The crosslinkers can have three or more silicon-bonded hydrolyzable groups per molecule. When the crosslinker is a silane and when the silane has three silicon-bonded hydrolyzable groups per molecule, the fourth groups is a non-hydrolyzable silicon-bonded organic group. The silicon-bonded organic groups are exemplified by alkyl groups such as methyl, ethyl, propyl, and butyl; cycloalkyl groups such as cyclopentyl and cyclohexyl; alkenyl groups such as vinyl and allyl; aryl groups such as phenyl, and tolyl; aralkyl groups such as 2-phenylethyl; and groups obtained by replacing all or part of the hydrogen in the preceding organic groups with halogen. The preferred silicon-bonded organic groups are preferably methyl.

The crosslinker can be a silane or siloxane, and in the case of siloxanes the molecular structure can be straight chain, branched, or cyclic. The silicon-bonded hydrolyzable groups are exemplified by acyloxy groups such as acetoxy, octanoyloxy, and benzoyloxy; ketoximo groups such as the dimethylketoximo group, the methylethylketoximo group, and the diethylketoximo group; alkoxy groups such as methoxy, ethoxy, and propoxy; alkenyloxy groups such as isopropenyloxy and 1-ethyl-2-methylvinyloxy; amino groups such as dimethylamino, diethylamino, butylamino, and cyclohexylamino; aminoxy groups such as dimethylaminoxy; and amido groups such as the N-methylacetamido group, N-ethylacetamido group, and N-methylbenzamido group.

The silanes and siloxanes are exemplified by methyltrimethoxysilane, methyltriethoxysilane, vinyltrimethoxysilane, methylphenyldimethoxysilane, 3,3,3-trifluoropropyltrimethoxy-silane, methyltriacetoxysilane, vinyltriacetoxysilane, phenyl-tripropionoxysilane, ethyltris(N,N-diethylamino)silane, vinyl-tris(N-methyl-N-cyclohexylamino)silane, dimethylbis(N,N-dibutyl-amino)silane, methyltris(N-methylacetamido)silane, methylvinylbis(N-ethylacetamido)-silane, vinyltris(N-ethylacetamido)silane, methyltris(N,N-diethylaminoxy) silane, phenyltris(N,N-diethyl-aminoxy)silane, methyltris(methylethylketoximo)silane, vinyl-tris (methylethylketoximo)silane, 3,3,3-trifluoropropyltris-(methylethylketoximo)silane, methyltris(isopropenoxy) silane, vinyltris(isopropenoxy) silane, ethylpolysilicate, n-propylorthosilicate, dimethyltetraacetoxydisiloxane, pentamethyltris(N,N-diethylaminoxy)cyclotetrasiloxane, cyclotetrasiloxane, hexamethylbis(N,N-diethylaminoxy) cyclotetrasiloxane and mixtures thereof.

Some of the crosslinkers can be triketoximosilanes and tetraketoximosilane, triacetoxysilanes and other triacyloxysilanes, trialkoxysilanes and tetraalkoxysilanes, silanes which contain mixtures of ketoximo and alkoxy groups wherein various silanes having from 0 to 4 ketoximo groups per molecule and from 0 to 4 alkoxy groups per molecule wherein the total combined number of alkoxy and ketoximo groups per molecule are three or four. Silanes having both silicon-bonded ketoximo groups and alkoxy groups in the same molecule are known from Klosowski et al in U.S. Pat. No. 4,657,967, issued Apr. 14, 1987, and from Haugsby et al in U.S. Pat. No. 4,973,623, issued Nov. 27, 1990. Both Klosowski et al and Haugsby et al are hereby incorporated by reference to show the silanes and mixtures of silanes which have both ketoximo groups and alkoxy groups on the same molecule. A tribenzamidosilane crosslinker is an example of another crosslinker which can be used in making one-package, RTV, silicone sealant compositions of this invention. These are illustrations of crosslinker silanes which can be used to make RTV silicone sealant compositions which are non-sag.

The curing catalysts for a particular RTV silicone sealant composition depends upon the speed of cure required. Most of the RTV silicone sealant compositions which contain oximosilanes or acetoxysilanes use a tin catalyst for curing, especially diorganotin dicarboxylate compounds such as dibutyltin dilaurate, dibutyltin diacetate, dimethyltin bis-neodecanoate, and the like whereas for the alkoxysilane crosslinker containing RTV silicone sealant compositions the most preferred curing catalyst is a titanium catalyst such as tetrabutyltitantate, tetraisopropyltitanate, diisopropyl bis-(acetylacetonyl) titanate, diisopropyl bis-(ethylacetoacetonyl) titanate, and the like. Such crosslinkers and curing catalysts are well known to silicone sealant artisans and are well known in the silicone sealant art. A typical one-package, RTV, silicone sealant is therefore made according to the present invention from the foundation mixture, crosslinker, curing catalyst, and may contain other kinds of ingredients which are known to be used in silicone sealants, such as extending fillers, pigments, fungicides, antioxidants, UV absorbers, and other additives.

The RTV silicone sealant compositions of this invention can be made from a foundation mixture which has been stored for more than one year and a non-sag one-package RTV silicone sealant composition can still be obtained. Even longer storage times are obtainable if the foundation mixture is kept cool, i.e. below 15° C. If, however, a conventional treated silica filler were used to make a foundation mixture, a one-package, RTV, silicone sealant composition (at practical silica filler concentrations) prepared from such a foundation mixture would not result in a non-sag product. Commercially available pretreated silicas, such as TS-610 and TS-530, can be used to make non-sag silicone sealant compositions, if diol is also used and the processes defined by this invention are used. In addition to obtaining non-sag one-package RTV silicone sealant compositions from the foundation mixture, the resulting sealant compositions have better clarity and better adhesion to plastics. An advantage of making non-sag silicone sealant composition from the foundation mixture of this invention is the ability to change from one cure chemistry, such as condensation reaction of silicon-bonded acetoxy functionality, to another cure chemistry, such as condensation reaction of silicon-bonded ketoximo functionality. Changing cure chemisties often in the past created large amounts of waste and long nonproductive time periods, however, with the processes of this invention the change over from one cure chemistry to another is fast and amount of waste is small. The flexibility of being able to change quickly and without loss of material and time is a great advantage. A significant feature of the process of this invention is the remarkably short time from the start of making the modified silica filler to the finished one-package RTV silicone sealant composition which can take less than 15 minutes total time. This is a substantial reduction in time over conventional manufacturing time for silicone sealants wherein the silica modification is included in the process time calculations.

The following examples are presented for illustrative purposes and should not be construed as limiting the invention which is properly delineated in the claims. In the following examples, "part" or "parts" are by weight, viscosities are as measured at 25° C. unless otherwise stated, Me is methyl radical,

EXAMPLE 1

Foundation mixtures were prepared by first preparing a free flowing powdered silica-polydimethylsiloxane concentrate by heating 3,000 g of LM150D a fumed silica filler having a BET surface area of 150 m²/g from Cabot Corporation to a temperature specified in Table I while being agitated in a Littleford FM-130 plowshear mixer having dry nitrogen gas sweep removing volatiles. There was added an amount, as specified in Table II, of diol surface modifying agent of the formula R'O(Me$_2$SiO)$_x$R' where x has an average value of 4 and about 20 percent of the R' are methyl radical. The length of time for the diol addition was as specified in Table I. The diol-silica mixture is agitated and heated at a temperature and for a time period which are specified in Table I. At the end of the specified time period, the diol-silica mixture was in a fluffy state. At this point, an amount of polydimethylsiloxane (Polymer A) having a viscosity of about 12.5 Pa.s and having 85% of the endgroups being hydroxyl and 15 of the endgroups being trimethylsiloxy units (prepared as described by Dupree) where the amount was as specified in Table II. Polymer A was added incrementally in amounts beginning with a 5 weight percent increment of the total amount of polydimethylsiloxane, then another 5 weight percent increment, followed by a 10 weight percent increment, a 20 weight percent increment, another 20 weight percent increment, and finally the remaining 40 weight percent. The addition of the polydimethylsiloxane was completed in a time period specified in Table I and a free flowing powdered silica-polydimethylsiloxane concentrate was obtained in each case. The heating was accomplished by an oil bath where the temperature was set at 180° C. The bulk densities were determined and the values observed were as shown in Table II and were reported in kilograms per cubic meter (kg/m³). The various times and temperatures were as shown in Table I. The total time to make the concentrate in Table I is more than the sum of the minutes for diol addition, minutes heating diol-silica mixture, and minutes to complete Polymer A addition because it includes the time for heating the silica filler and some time lapsed between the various steps.

TABLE I

| CONC (1) | Silica Temp. at start of diol addition | Minutes for diol addition | Minutes heating Poly-silica mixture | Temp. at start of Poly-mer A Addition | Minutes to complete make mer A Addition | Total Time to CONC (1) minutes |
|---|---|---|---|---|---|---|
| 1 | 100° C. | 1.0 | 1.0 | 105° C. | 6.0 | 9.0 |
| 2 | 132° C. | 2.5 | 0.5 | 128° C. | 3.0 | 7.5 |
| 3 | 127° C. | 2.5 | 1.0 | 126° C. | 2.5 | 7.5 |
| 4 | 140° C. | 2.5 | 1.0 | 140° C. | 2.5 | 10.0 |
| 5 | 142° C. | 0.5 | 1.0 | 135° C. | 2.0 | 7.5 |
| 6 (2) | 134° C. | 2.5 | 0.5 | 128° C. | 2.5 | 7.5 |
| 7 (3) | 142° C. | 2.0 | 0.5 | 140° C. | 3.0 | 8.0 |
| 8 (3) | 130° C. | 2.5 | 1.0 | 141° C. | 1.5 | 6.5 |

(1)CONC = free flowing powdered silica-polydimethylsiloxane concentrate
(2)3,000 g of MS-75, a fumed silica having a BET surface area of 250 m²/g from Cabot Corporation replaced the LM150D
(3)6 grams of hexamethyldisilizane added after the silica was heating and the volatiles were removed and prior to the addition of the diol

TABLE II

| CONC (1) | Amount diol, g | Weight ratio diol to filler | Polymer A grams | Bulk Density of CONC (1) kg/m³ |
|---|---|---|---|---|
| 1 | 880 | 0.293 | 6120 | — |
| 1 | 770 | 0.257 | 6120 | 570 |
| 3 | 880 | 0.293 | 6120 | 560 |
| 4 | 441 | 0.147 | 6556 | 560 |
| 5 | 220 | 0.073 | 6789 | 560 |
| 6 (2) | 880 | 0.293 | 6120 | 530 |
| 7 (3) | 880 | 0.293 | 6103 | 560 |
| 8 (3) | 880 | 0.293 | 6103 | 530 |

(1)CONC = free flowing powdered silica-polydimethylsiloxane concentrate
(2)3,000 g of MS-75, a fumed silica having a BET surface area of 250 m²/g from Cabot Corporation replaced the LM150D
(3)6 grams of hexamethyldisilazane added after the silica was heating and the volatiles were removed and prior to the addition of the diol The powdered concentrate was stored in closed containers at room temperature for the time periods shown in Table III before making foundation mixtures (referred to herein as FM). The powdered concentrates were massed by placing an amount in a Haake mixer (Haake Fison Rheocord 90, from Haake at 53 West Century Road, Paramus, N.J. 07652). The Haake mixer had a sigma blade and a wiper blade with heating capability and an ability to measure the energy required for mixing. The powdered concentrate was added to the mixer which had been heated to 120° C. prior to the addition. The heated powdered concentrate was added to the mixer with the blades turning and completely filled the mixer. Massing began almost immediately upon the start of the concentrate addition. The mixer's ram was then lowered to force all the materials together to ensure good mixing and reduce void formation. Without the ram, partially masses material tended to rise from the mixer and a uniform paste was not obtained. The heated concentrate increased the rate of massing. Although the concentrate could be massed without heating it prior to addition to the mixer, it massed slower and tended to be less uniform under such mixing conditions. Incremental amounts of a polydimethylsiloxane like Polymer A except that the viscosity was about 16.5 Pa.s (referred to as Polymer B) was added to each concentrate in the Haake mixer. The total amounts of Polymer B added were as shown in Table III and were added in the following increments which amounts were based on weight percentages of the total amount added, 5wt %, 5wt %, 10wt %, 20wt %, 20wt %, and 40wt %. After the addition of each increment of Polymer B, the power required for mixing was decreased and the mixing time between each addition was one or two minutes. The time of mixing was determined by observation of the power requirement and after each addition, when the power stabilized, the next increment of Polymer B was added. The resulting foundation mixtures (FM) were stored in sealed Semco(R) tubes. Semco(R) tubes protected the FM from moisture. The Plateau Stress for each FM after defined periods of storage was determined and was as shown in Table IV in dynes/cm². The Plateau Stress was measured on a Carri-Med Rheometer (Model CSL 500) as described herein. Concentrate 5 was used to prepare an FM, but the resulting product was difficult to mix and it was not uniform and contained lumps, therefore further evaluation was discontinued. Concentrate 5 would be expected to useful in making FM with lower viscosity polydiorganosiloxanes than used in this example. Concentrate 5 also illustrated that the lower limit for the ratio of diol to filler was 0.05.

TABLE III

| FM | CONC (1) Used | Days CONC Aged Before Massing | Weight CONC grams | Total Weight Polymer B Added grams | Silica Content in FM as pts/100 pts Polymers A & B |
|----|---|---|---|---|---|
| A | 3 | 250 | 17.47 | 21.46 | 22 |
| B | 3 | 250 | 19.49 | 30.51 | 13.5 |
| C | 4 | 250 | 19.65 | 30.35 | 14.6 |
| D | 5 | 272 | 19.65 | — | — |
| E | 6 | 252 | 19.49 | 30.51 | 13.5 |
| F | 8 | 250 | 19.49 | 30.51 | 13.5 |

TABLE IV

| | Plateau Stress in dynes/cm² after | | | | |
|---|---|---|---|---|---|
| FM | 0 days | 7 days | 14 days | 20 days | 350 days |
| A | 5823 | 5823 | — | — | 4867 |
| B | 1985 | 1985 | — | — | 1326 |
| C | 1268 | — | 1060 | — | 593 |
| E | 1300 | 1108 | — | — | 846 |
| F | 1268 | — | — | 1260 | 11569 |

From Table IV, the drop in the Plateau Stress during storage from 1060 dynes/cm² at 14 days to 593 dynes/cm² at 350 days for FM-C, whereas FM-A, FM-B, FM-E, and FM-F maintained Plateau Stresses higher than 700 for at least 350 days (almost a year). As was also observed as shown in Table V, FM-C after 98 days storage had a slump of 0.51 cm which indicated that this FM was reaching its storage stability limit, whereas FM-E after being stored for 350 days had a slump of 0.51, and FM-A, FM-B, and FM-F each did not reach a slump of 0.51 cm after they had been stored for 350 days. This shorter stability time for FM-C directly related to the lower weight ratio of diol to silica filler.

The slump values of each FM were determined after various storage periods using ASTM D 2202 procedure, and were as shown in Table V. The extrusion rates of each FM were also determined by using ASTM C 603 procedure and were as shown in Table VI. The ASTM C 603 procedure was followed except the FM was extruded through a nozzle with a 0.3175 cm orifice at a pressure of 620.5 kPa.

TABLE V

| | Slump (in cm) of FM stored for | | | | | |
|---|---|---|---|---|---|---|
| FM used | 0 days | 7 days | 14 days | 20 days | 98 days | 350 days |
| A | 0 | 0 | — | 0 | — | 0 |
| B | 0 | 0.127 | — | 0.076 | — | 0.203 |
| C | 0.51 | — | 0.51 | — | 0.304 | 2.03 |
| E | 0.127 | 0.203 | — | 0.254 | — | 0.51 |
| F | 0.203 | — | 0.127 | — | 0.254 | — |

TABLE VI

| | Extrusion Rate (in gm/minute) of FM stored for | | | | | |
|---|---|---|---|---|---|---|
| FM used | 0 days | 7 days | 14 days | 20 days | 98 days | 350 days |
| A | 172 | 100 | — | 105 | — | 125 |
| B | 400 | 284 | — | 272 | — | 318 |
| C | 307 | — | 160 | — | 155 | 176 |
| E | 333 | 275 | — | 222 | — | 251 |
| F | 400 | — | 465 | — | — | 438 |

Table VI showed that these FM's had acceptable and comparable extrusion rates both initially and after the FM was stored for substantial periods of time which showed that they had storage stability.

Each of the foundation mixtures, A, B, C, E, and F were compounded into silicone sealant compositions by mixing 95 parts of a specific FM with 5 parts of a crosslinker mixture of 99.5 weight percent which was 50 weight percent methyltriacetoxysilane and 50 weight percent ethyltriacetoxysilane and 0.5 weight percent dibutyltin dilaurate. The FM was desired by centrifuging it in a Semco tube, admixing the crosslinker mixture to make a uniform composition. The slump values and extrusion rates as described above were determined for the sealant compositions made from the various FM's. The skin-over-time (SOT) in minutes was also determined by spreading out a sample of the sealant composition, about 0.20 to 0.23 cm thick, the surface of the sample was touched lightly with a finger to determine if a skin had formed on the sample's surface. The SOT was the time period in minutes from the samples initial layout until the finger could be touched lightly to the surface of the sample without sealant composition adhering to the finger. The tack-free-time (TFT) in minutes was determined by ASTM C 679 procedure and results were recorded in minutes. The results for the slump values, the extrusion rates, the SOT, and the TFT were as reported in Tables VII, VIII, IX, and X.

TABLE VII

Slump (in cm) of Sealant Made with acetoxysilane crosslinker and from FM stored for

| FM used | 0 days | 7 days | 14 days | 20 days | 98 days | 350 days |
|---|---|---|---|---|---|---|
| A | 0 | 0 | — | 0 | — | 0 |
| B | 0.102 | 0.025 | — | 0.127 | — | 0.051 |
| C | 0.127 | — | — | — | 0.127 | 3.81 |
| E | 0.051 | 0.229 | — | 0.025 | — | 0.51 |
| F | 0.127 | — | 0.254 | — | — | 0.254 |

TABLE VIII

Extrusion Rate (in gm/minute) of Sealant Made with acetoxysilane crosslinker and from FM stored for

| FM used | 0 days | 7 days | 14 days | 20 days | 98 days | 350 days |
|---|---|---|---|---|---|---|
| A | 333 | 116 | — | 202 | — | 264 |
| B | 477 | 375 | — | 441 | 375 | 548 |
| C | 400 | — | — | — | 300 | 339 |
| E | 380 | 355 | — | 376 | — | 484 |
| F | 438 | — | 453 | — | — | 705 |

TABLE IX

SOT (in min) of Sealant Made with acetoxysilane crosslinker and from FM stored for

| FM used | 0 days | 7 days | 14 days | 20 days | 98 days | 350 days |
|---|---|---|---|---|---|---|
| A | 5 | 2 | — | 3 | — | 4 |
| B | 8 | 7 | ≧ | 8 | 9 | 10 |
| C | 8 | — | — | — | 8 | 10 |
| E | 9 | 8 | — | 10 | — | 12 |
| F | 8 | — | 8 | — | — | 9 |

TABLE X

TFT (in min) of Sealant Made with acetoxysilane crosslinker and from FM stored for

| FM used | 0 days | 7 days | 14 days | 20 days | 98 days | 350 days |
|---|---|---|---|---|---|---|
| A | 9 | 10 | — | 9 | — | 10 |
| B | 22 | 23 | — | 24 | 24 | 24 |
| C | 22 | — | — | — | 25 | 21 |

TABLE X-continued

TFT (in min) of Sealant Made with acetoxysilane crosslinker and from FM stored for

| FM used | 0 days | 7 days | 14 days | 20 days | 98 days | 350 days |
|---|---|---|---|---|---|---|
| E | 24 | 22 | — | 20 | — | 22 |
| F | 22 | — | 26 | — | 1' | 21 |

Table VI showed that the silicone sealant compositions prepared from these FM's had very usable extrusion rates whether made from an FM initially or after the FM was stored for substantial periods of time.

Sealant compositions were also prepared by admixing 9 parts of a ketoximosilane mixture of about 70 weight percent methyltri(methylethylketoximo)silane, 24 weight percent of methyldi(methylethylketoximo)silane, 0.5 weight percent of methyldimethoxy(methylethylketoximo)silane, and 5.5 weight percent impurities, 1.8 parts N-beta-aminoethyl-gamma-aminopropyltrimethoxysilane, and 0.18 part dibutyltin dilaurate with 100 parts of the specified FM in Table XI. After a storage period of one day, the slump value, the extrusion rate, the SOT, the TFT, the durometer on the Shore A scale according to ASTM C-661, and using the procedure of ASTM D-412, the tensile at break, the elongation at break, and the 100% modulus were determine and the results were as reported in Table XI.

TABLE XI

| FM Used | Slump cm | Extrusion rate g/min | SOT min | TFT min | Durometer Shore A | Tensile kPa | Elongation % | 100% Modulus kPa |
|---|---|---|---|---|---|---|---|---|
| B | 0.025 | 627 | <12 | 43 | 38 | 2020 | 312 | 834 |
| C | 0.127 | 505 | 8 | 53 | 36 | 1296 | 219 | 752 |
| E | 0.025 | — | 13 | 35 | 39 | 1407 | 234 | 793 |
| F | 0.025 | 597 | 9 | 40 | 38 | 1689 | 263 | 827 |

The results shown in Table XI showed that FM's prepared in accordance with this invention can also be used to make RTV silicone sealant compositions which had very low slump, good extrusion rates and cure rates as shown by the SOT and TFT, as well as cured sealant properties.

COMPARISON EXAMPLE 1

Comparison foundation mixtures (C-FM) were prepared by conventional methods and using materials which were available in the prior art. These C-FMs were prepared by admixing 100 parts of Polymer A, an amount of a commercially available treated silica filler as shown in Table XII, and, in some C-FM, a hydroxyl endblocked polydimethylsiloxane fluid (PDMS Fluid) having an average of about 11 dimethylsiloxane units per molecule and about 4 weight percent hydroxyl group. These C-FMs were mixed using a twin screw extruder which was cooled to maintain the temperature at about ambient. Each of the C-FM after defined periods of aging were further mixed with an amount of crosslinker mixture of acetoxysilanes and tin catalyst as described in Example 1. The slump values of the catalyzed silicone composition was determined, as well as, the SOT and TFT. The results observed were as shown in Table XIII, Table XIV, Table XV, and Table XVI

TABLE XII

| Comparison FM | Silica Type | Silica Amount, parts | PDMS Fluid parts |
|---|---|---|---|
| 1 | M-7 (4) | 11.5 | 0 |
| 2 | TS-610 | 11.5 | 0 |
| 3 | TS-610 | 13.5 | 0 |
| 4 | TS-610 | 15.5 | 0 |
| 5 | TS-610 | 15.5 | 4 |
| 6 | TS-610 | 13.5 | 4 |
| 7 | TS-530 | 13.5 | 4 |

(4)M-7 was an untreated fumed silica from Cabot Corporation with a BET surface area of about 200 m²/g.

TABLE XIII

Slump (in cm) of Sealant Made with acetoxysilane crosslinker and from Comparison FM stored for

| C-FM used | 0 days | 7 days | 21 days | 56 days | 98 days |
|---|---|---|---|---|---|
| 1 | 0 | — | — | — | — |
| 2 | — | 0.51 | 10.2 | 10.2 | >10.2 |
| 3 | 0.51 | 2.03 | 7.6 | >10.2 | >10.2 |
| 4 | 0.76 | 2.03 | — | 2.54 | 8.13 |
| 5 | 0.127 | 1.02 | 1.02 | 2.54 | 5.84 |
| 6 | 0.254 | 0.76 | >7.6 | >7.6 | >10.2 |
| 7 | 0.76 | 0.76 | 2.03 | 2.03 | 1.78 |

TABLE XIV

SOT (in min) of Sealant Made with acetoxysilane crosslinker and from C-FM stored for

| C-FM used | 0 days | 7 days | 21 days | 56 days | 98 days |
|---|---|---|---|---|---|
| 1 | 6 | — | — | — | — |
| 2 | — | 7 | 8 | — | — |
| 3 | 16 | 7 | 8 | 11 | 10 |
| 4 | 16 | 12 | 9 | 10 | 11 |
| 5 | 16 | 9 | 7 | 10 | 11 |
| 6 | 16 | 8 | 8 | 11 | 11 |
| 7 | 16 | 8 | 7 | 10 | 11 |

TABLE XV

TFT (in min) of Sealant Made with acetoxysilane crosslinker and from C-FM stored for

| C-FM used | 0 days | 7 days | 21 days | 56 days | 98 days |
|---|---|---|---|---|---|
| 1 | 16 | — | — | — | — |
| 2 | — | 30 | >22 | — | 1' |
| 3 | 25 | 30 | 18 | 18 | 20 |
| 4 | 25 | 26 | 19 | 19 | 21 |
| 5 | 25 | 23 | 16 | 19 | 19 |
| 6 | 25 | 21 | 19 | 19 | 18 |
| 7 | 25 | 20 | 19 | 19 | 19 |

TABLE XVI

Extrusion Rate (in gm/minute) of Sealant Made with acetoxysilane crosslinker and from C-FM stored for

| C-FM used | 0 days | 7 days | 21 days | 56 days | 98 days |
|---|---|---|---|---|---|
| 1 | — | — | — | — | — |
| 2 | — | 329 | 328 | — | — |
| 3 | 451 | 234 | 213 | 200 | 180 |
| 4 | 515 | 182 | 185 | 150 | 120 |
| 5 | 552 | 451 | 390 | 374 | |
| 6 | 656 | 492 | 429 | 402 | 368 |
| 7 | 780 | 387 | 416 | 400 | 376 |

From Tables XIII, XIV, XV, and XVI these results showed that the conventional method of preparing RTV silicone composition did not provide a low slump product although the SOT and TFT were acceptable. The C-FM's 2, 3, and 4 were made using treated silica fillers and C-FM's were made from treated silica fillers plus an additional amount of a treating agent as suggested by the prior art and even these treated silica fillers with additional treating agent did not provide an RTV silicone sealant composition with low slump properties beyond a one week storage of the comparison foundation mixture. The extrusion rates dropped off rapidly for those comparison foundation mixtures which did not contain the additional treating agent.

EXAMPLE 2

A free flowing powdered concentrate was prepared by mixing and processing in the manner described in Example 1, 35 parts of silica, 8.75 parts of a diol which had a formula HO(Me₂SiO)ₓH in which x was such that 91.7 weight percent of the molecules had a value for x of 2 to 10 and 1.44 weight percent had a value for x of 11 to 18, and 56.25 parts of Polymer B.

A foundation mixture was prepared by massing and adding sufficient Polymer B to provide a foundation mixture which had 22 weight percent silica. The plateau stress was determined for the FM which was 1715 dynes/cm² after 3 days aging at room temperature, 1825 dynes/cm² after 7 days aging at room temperature, 1513 dynes/cm² after 28 days aging at room temperature, and 1255 dynes/cm² after aging 56 days aging at room temperature. The slump for the FM was 0.025 cm after 3 days aging at room temperature.

EXAMPLE 3

A free flowing powdered concentrate was prepared by loading 200 g of M-7 silica filler, as defined in Comparison Example 1, into a Littleford Mixer (Model W-10 High Intensity Laboratory Mixer). It was mixed for about 30 seconds at full speed without heating. The mixer was opened, the walls were scraped, the mixer was closed, and then 50 g of the diol surface modifying agent defined in Example 1 was added with the mixer at half speed. The resulting mixture was mixed for about 30 seconds after the diol addition was complete. The mixer was again stopped and the walls were scraped. Next 321 g of a polydimethylsiloxane (hereinafter identified as Polymer C and prepared as described in U.S. Pat. No. 4,898,910) having about 20% of the terminals being vinyldimethylsiloxy and about 80% of the terminals being of the following formula

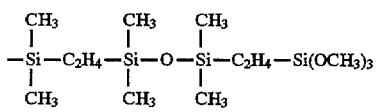

and having a viscosity of about 65 Pa.s, was added with the mixer at low speed, about 50 rpm. After Polymer C addition was complete, the speed was increased to 100 rpm, and then for every 15 seconds the speed was increased by 100 rpm until the mixing speed reached 600 rpm and held at 600 rpm for about 50 seconds. The resulting product was a free flowing powdered concentrate which was removed from the mixer and stored at room temperature for 35 days.

A foundation mixture was then prepared by placing 50 g of powdered concentrate into a dental mixer and massing for 16 seconds at full speed. To the massed concentrate was added 10 parts of Polymer C were added and mixed for 16 seconds, the walls of the mixer were scraped and then mixed for another 16 seconds. To the resulting mass, 19.54 g of Polymer C were added and the paste was mixed for 26 seconds. The resulting massed concentrate had 22 weight percent silica filler and was stored in a double friction can. 50 g of the massed concentrate was massed and then in a Semco mixer, 49.81 g of Polymer C were added to the massed concentrate and mixer to provide a foundation mixture having 11 weight percent silica filler.

A room temperature vulcanizable sealant was prepared by mixing 90.74 parts of foundation mixture with 5.79 parts of methyltrimethoxysilane, 2.47 parts of diisopropoxy bis (ethylacetoacetate) titanium, and 1 part of beta-aminoethyl-gamma-aminopropyltrimethoxysilane. The resulting sealant had a slump of 0 (zero), an extrusion rate of 103, a SOT between 5 and 15 minutes, and a TFT of 1.2 hours. A sample of the resulting sealant composition was exposed to atmospheric moisture and allowed to cure for seven days and then the cured properties were measured. The resulting sealant has a durometer on the Shore A scale of 34, a tensile strength at break of 1655 kPa, and elongation at break of 292%, and a 100% modulus of 683 kPa.

That which is claimed is:

1. A process for making a polydiorganosiloxane-silica foundation mixture from a free-flowing, powdered, surface-modified, reinforcing silica-polydiorganosiloxane concentrate comprising (i) combining, while mixing and heating, reinforcing silica filler having a surface area of 90 to 500 m²/g and having a median aggregate-agglomerate particle size less than 600 micrometers and a diol surface modifying agent of the formula R'O(R₂SiO)ₓR' wherein R is methyl, ethyl, vinyl, 3,3,3-trifluoropropyl, or phenyl, each R' is selected from the group consisting of hydrogen atom, methyl radical, and ethyl radical, up to 30 percent of R' groups are methyl radical or ethyl radical, and x is a value of from 2 to 18 inclusive and the diol surface modifying agent has at least 3 weight percent silicon-bonded hydroxyl group, making a filler mixture where there is 0.05 to 0.5 part by weight of diol per one part by weight of silica filler, (ii) mixing the filler mixture at a temperature in the range of from 20° C. to <180° C. and maintaining the filler mixture in a fluidized powder state until the diol is dispersed throughout the silica filler and the median aggregate-agglomerate particle size of the filler mixture is less than the median aggregate-agglomerate particle size of the silica filler, this mixing process does not exceed 5 minutes in duration, and removing volatiles from the filler mixture during the mixing process where a modified silica filler is obtained, (iii) adding gradually, with mixing, a polydiorganosiloxane having a viscosity measured at 25° C. of from 0.1 to 400 Pa.s to the modified silica filler obtained from step (ii) and completing the addition in <10 minutes after the modified silica filler is obtained at the conclusion of step (ii), where the amount of polydiorganosiloxane is added to provide from 25 to 40 weight percent silica filler based on the total weight of the polydiorganosiloxane and the modified silica filler, thereafter (iv) mixing until a uniform free flowing powder of a reinforcing silica-polydiorganosiloxane concentrate is obtained where the total mixing time of steps of (iii) and (iv) does not exceed 10 minutes, thereafter (v) massing the uniform free-flowing silica-polydiorganosiloxane concentrate obtained from step (iv) until a paste consistency mixture is obtained, and (vi) admixing gradually more polydiorganosiloxane making a uniform foundation mixture having a higher concentration of polydiorganosiloxane than the free-flowing silica-polydiorganosiloxane concentrate and the silica filler content of the uniform foundation mixture is from 5 to 20 weight percent based on the total weight of the foundation mixture.

2. The process according to claim 1 in which the silica filler content of the foundation mixture of step (vi) is from 5 to 15 weight percent based on the total weight of the foundation mixture.

3. The process according to claim 2 in which the diol surface modifying agent is a mixture of molecules in which at least 50 percent of the molecules have x values of no more than 6 and the silicon-bonded hydroxyl content of the mixture is at least 6 weight percent.

4. The process according to claim 2 in which the polydiorganosiloxane in step (iii) is added incrementally to the modified silica filler of step (ii).

5. The process according to claim 3 in which the polydiorganosiloxane in step (iii) is added incrementally to the modified silica filler of step (ii).

6. A foundation mixture obtained from the process of claim 2 which has a plateau stress of >700 dynes/cm² and a shear-thinned viscosity of no more than 1,000 Pa.s at a shear stress of 50,000 dynes/cm² and the plateau stress and shear-thinned viscosity are measured at 25° C.

7. A foundation mixture obtained from the process of claim 2 which has a plateau stress of >1000 dynes/cm² and a shear-thinned viscosity of no more than 600 Pa.s at a shear stress of 50,000 dynes/cm² and the plateau stress and shear-thinned viscosity are measured at 25° C.

8. A foundation mixture obtained from the process of claim 3 which has a plateau stress of >700 dynes/cm² and a shear-thinned viscosity of no more than 1,000 Pa.s at a shear stress of 50,000 dynes/cm² and the plateau stress and shear-thinned viscosity are measured at 25° C.

9. A foundation mixture obtained from the process of claim 3 which has a plateau stress of >1000 dynes/cm² and a shear-thinned viscosity of no more than 600 Pa.s at a shear stress of 50,000 dynes/cm² and the plateau stress and shear-thinned viscosity are measured at 25° C.

10. A process for making polydiorganosiloxane-silica foundation mixture from a free-flowing, powdered, surface-modified, reinforcing silica-polydiorganosiloxane concentrate comprising (a) heating reinforcing silica filler having a surface area of 90 to 500 m²/g and having a median aggregate-agglomerate particle size less than 600 micrometers to a temperature in a range of from >100° C. to <180° C., removing volatiles from the silica filler, thereafter (b) adding to the heated reinforcing silica filler while mixing, a diol surface modifying agent of the formula R'O(R$_2$SiO)$_x$R' wherein R is methyl, ethyl, vinyl, 3,3,3-trifluoropropyl, or phenyl; each R' is selected from the group consisting of hydrogen atom, methyl radical, and ethyl radical, up to 30 percent of R' are methyl radical or ethyl radical, and x is a value of from 2 to 18 inclusive and has at least 3 weight percent silicon-bonded hydroxyl group, making a filler mixture where there is 0.05 to 0.5 part by weight of diol per one part by weight of silica filler, and (c) heating and mixing the filler mixture at a temperature in the range of from >100° C. to <180° C. and maintaining the filler mixture in a fluidized state until the diol is dispersed throughout the silica filler and the median aggregate-agglomerate particle size of the filler mixture is less than the median aggregate-agglomerate particle size of the silica filler, the mixing process does not exceed 5 minutes in duration, and removing volatiles from the filler mixture during the mixing process where a modified silica filler is obtained, (d) adding gradually, with mixing, a polydiorganosiloxane having a viscosity measured at 25° C. of from 0.1 to 400 Pa.s to the modified silica filler of step (c) and completing the addition in <10 minutes after the modified silica filler is obtained at the conclusion of step (c), where the amount of polydiorganosiloxane is added to provide from 25 to 40 weight percent silica filler based on the total weight of the polydiorganosiloxane and the modified silica filler, thereafter (e) mixing until a uniform, free-flowing, powdered, surface-modified, reinforcing silica-polydiorganosiloxane concentrate is obtained where the total mixing time of steps (d) and (e) does not exceed 10 minutes, thereafter (f) massing the uniform free-flowing silica-polydiorganosiloxane concentrate obtained from step (e) until a paste consistency mixture is obtained, and thereafter (g) admixing gradually more polydiorganosiloxane making a uniform foundation mixture having a higher concentration of polydiorganosiloxane than the uniform free-flowing silica-polydiorganosiloxane concentrate obtained in step (e) and the silica filler content of the foundation mixture is from 5 to 20 weight percent based on the total weight of the foundation mixture.

11. The process according to claim 10 in which the silica filler content of the foundation mixture of step (g) is from 5 to 15 weight percent based on the total weight of the foundation mixture.

12. The process according to claim 11 in which the diol surface modifying agent is a mixture of molecules in which at least 50 percent of the molecules have x values of no more than 6 and the silicon-bonded hydroxyl content of the mixture is at least 6 weight percent.

13. The process according to claim 11 in which the polydiorganosiloxane in step (d) is added incrementally to the modified silica filler of step (c).

14. The process according to claim 12 in which the polydiorganosiloxane in step (d) is added incrementally to the modified silica filler of step (c).

15. A foundation mixture obtained from the process of claim 11 which has a plateau stress of >700 dynes/cm$^2$ and a shear-thinned viscosity of no more than 1,000 Pa.s at a shear stress of 50,000 dynes/cm$^2$ and the plateau stress and the shear-thinned viscosity are measured at 25° C.

16. A foundation mixture obtained from the process of claim 11 which has a plateau stress of >1000 dynes/cm$^2$ and a shear-thinned viscosity of no more than 600 Pa.s at a shear stress of 50,000 dynes/cm$^2$ and the plateau stress and the shear-thinned viscosity are measured at 25° C.

17. A foundation mixture obtained from the process of claim 12 which has a plateau stress of >700 dynes/cm$^2$ and a shear-thinned viscosity of no more than 1,000 Pa.s at a shear stress of 50,000 dynes/cm$^2$ and the plateau stress and the shear-thinned viscosity are measured at 25° C.

18. A foundation mixture obtained from the process of claim 12 which has a plateau stress of >1000 dynes/cm$^2$ and a shear-thinned viscosity of no more than 600 Pa.s at a shear stress of 50,000 dynes/cm$^2$ and the plateau stress and the shear-thinned viscosity are measured at 25° C.

19. The foundation mixture according to claim 6 in which the polydiorganosiloxane has at least 80 percent of the ends terminated with silicon-bonded hydroxyl groups.

20. The foundation mixture according to claim 7 in which the polydiorganosiloxane has at least 80 percent of the ends terminated with silicon-bonded hydroxyl groups.

21. The foundation mixture according to claim 8 in which the polydiorganosiloxane has at least 80 percent of the ends terminated with silicon-bonded hydroxyl groups.

22. The foundation mixture according to claim 9 in which the polydiorganosiloxane has at least 80 percent of the ends terminated with silicon-bonded hydroxyl groups.

23. The foundation mixture according to claim 15 in which the polydiorganosiloxane has at least 80 percent of the ends terminated with silicon-bonded hydroxyl groups.

24. The foundation mixture according to claim 16 in which the polydiorganosiloxane has at least 80 percent of the ends terminated with silicon-bonded hydroxyl groups.

25. The foundation mixture according to claim 17 in which the polydiorganosiloxane has at least 80 percent of the ends terminated with silicon-bonded hydroxyl groups.

26. The foundation mixture according to claim 18 in which the polydiorganosiloxane has at least 80 percent of the ends terminated with silicon-bonded hydroxyl groups.

27. A room temperature vulcanizable silicone sealant composition comprising the foundation mixture according to claim 6 and further comprising a moisture hydrolyzable crosslinking silicone compound.

28. A room temperature vulcanizable silicone sealant composition comprising the foundation mixture according to claim 7 and further comprising a moisture hydrolyzable crosslinking silicone compound.

29. A room temperature vulcanizable silicone sealant composition comprising the foundation mixture according to claim 8 and further comprising a moisture hydrolyzable crosslinking silicone compound.

30. A room temperature vulcanizable silicone sealant composition comprising the foundation mixture according to claim 9 and further comprising a moisture hydrolyzable crosslinking silicone compound.

31. A room temperature vulcanizable silicone sealant composition comprising the foundation mixture according to claim 15 and further comprising a moisture hydrolyzable crosslinking silicone compound.

32. A room temperature vulcanizable silicone sealant composition comprising the mixture according to claim 16 and further comprising a moisture hydrolyzable crosslinking silicone compound.

33. A room temperature vulcanizable silicone sealant composition comprising the foundation mixture according to claim 17 and further comprising a moisture hydrolyzable crosslinking silicone compound.

34. A room temperature vulcanizable silicone sealant composition comprising the foundation mixture according to claim 18 and further comprising a moisture hydrolyzable crosslinking silicone compound.

35. A room temperature vulcanizable silicone sealant composition comprising the foundation mixture according to claim 19 and further comprising a moisture hydrolyzable crosslinking silicone compound.

36. A room temperature vulcanizable silicone sealant composition comprising the foundation mixture according to claim 20 and further comprising a moisture hydrolyzable crosslinking silicone compound.

37. A room temperature vulcanizable silicone sealant composition comprising the foundation mixture according to claim 21 and further comprising a moisture hydrolyzable crosslinking silicone compound.

38. A room temperature vulcanizable silicone sealant composition comprising the foundation mixture according to claim 22 and further comprising a moisture hydrolyzable crosslinking silicone compound.

39. A room temperature vulcanizable silicone sealant composition comprising the foundation mixture according to claim 23 and further comprising a moisture hydrolyzable crosslinking silicone compound.

40. The method in accordance with claim 2 in which the diol surface modifying agent is present in an amount such that there is 0.015 to 0.025 part by weight of the silicon-bonded hydroxyl group per one part by weight of silica filler.

41. The method in accordance with claim 3 in which the diol surface modifying agent is present in an amount such that there is 0.015 to 0.025 part by weight of the silicon-bonded hydroxyl group per one part by weight of silica filler.

42. The method in accordance with claim 11 in which the diol surface modifying agent is present in an amount such that there is 0.015 to 0.025 part by weight of the silicon-bonded hydroxyl group per one part by weight of silica filler.

43. The method in accordance with claim 12 in which the diol surface modifying agent is present in an amount such that there is 0.015 to 0.025 part by weight of the silicon-bonded hydroxyl group per one part by weight of silica filler.

44. A foundation mixture obtained from the process of claim 41 which has a plateau stress of >1000 dynes/cm$^2$.

45. A foundation mixture obtained from the process of claim 43 which has a plateau stress of >1000 dynes/cm$^2$.

46. A foundation mixture comprising 5 to 20 parts by weight reinforcing silica filler having a surface area of 90 to 500 m$^2$/g, and 80 to 95 parts by weight of a polydiorganosiloxane having a viscosity of from 0.1 to 400 Pa.s where such foundation mixture has a plateau stress of >700 dynes/cm$^2$ and a shear-thinned viscosity of no more than 1,000 Pa.s at a shear stress of 50,000 dynes/cm$^2$ and the plateau stress and the shear-thinned viscosity are measured at 25° C.

47. The foundation mixture according to claim 46 in which the plateau stress is >1,000 and the shear-thinned viscosity is no more than 600 Pa.s at a shear stress of 50,000 dynes/cm$^2$.

48. A room temperature vulcanizable silicone sealant composition prepared by mixing the foundation mixture of claim 45 with a moisture hydrolyzable crosslinking silicone compound.

49. A room temperature vulcanizable silicone sealant composition prepared by mixing the foundation mixture of claim 46 with a moisture hydrolyzable crosslinking silicone compound.

* * * * *